United States Patent [19]

Poucher

[11] Patent Number: 5,027,928
[45] Date of Patent: Jul. 2, 1991

[54] SUSPENSION ARRANGEMENT

[75] Inventor: Michael Poucher, Cheltenham, England

[73] Assignee: Dowty Rotol Limited, Gloucester, England

[21] Appl. No.: 332,800

[22] Filed: Apr. 3, 1989

[30] Foreign Application Priority Data

Apr. 5, 1988 [GB] United Kingdom ............... 8807891

[51] Int. Cl.$^5$ ............................................. B60G 11/26
[52] U.S. Cl. .................................. 188/299; 188/282;
188/319; 188/322.15; 251/129.05
[58] Field of Search ............... 188/319, 299, 322.15,
188/282; 137/487.5; 251/129.05, 129.08,
129.17, 129.19, 61.3

[56] References Cited

U.S. PATENT DOCUMENTS

| | | | |
|---|---|---|---|
| 2,828,960 | 4/1958 | Lucien et al. | 267/64.15 |
| 4,530,425 | 7/1985 | Veaux et al. | 188/319 X |
| 4,591,186 | 5/1986 | Ashiba | 188/299 X |
| 4,620,619 | 11/1986 | Emura et al. | 188/299 X |
| 4,683,992 | 8/1987 | Watanabe | 188/299 |
| 4,754,855 | 7/1988 | Kuwana et al. | 188/299 |
| 4,789,051 | 12/1988 | Kruckemeyer | 188/299 |
| 4,800,994 | 1/1989 | Imaizumi et al. | 188/299 X |
| 4,800,995 | 1/1989 | Bernhardt et al. | 188/299 X |
| 4,813,519 | 3/1989 | Matsubara et al. | 188/299 |

FOREIGN PATENT DOCUMENTS

| | | |
|---|---|---|
| 0122575 | 10/1984 | European Pat. Off. . |
| 0188199 | 7/1986 | European Pat. Off. . |
| 0212022 | 3/1987 | European Pat. Off. . |
| 0240704 | 10/1987 | European Pat. Off. . |
| 58-68528 | 4/1983 | Japan . |
| 2120355 | 11/1983 | United Kingdom . |

Primary Examiner—Matthew C. Graham
Attorney, Agent, or Firm—Young & Thompson

[57] ABSTRACT

A suspension arrangement for use with aircraft landing gear, including an upper strut, a lower strut that is assembled with and telescopes relative to the upper strut and an oil reservoir within the struts. An adjustable valve assembly includes two interacting relatively movable members which divide the oil reservoir into two distinct sections and provides a restricted flow path for the flow of oil from one section of the oil reservoir to the other. Each of the relatively movable members includes apertures for the flow of oil from one section of the oil reservoir to the other thereby to provide that flow path, the aperture being a series of windows in one member registrable with ports in the other member. A drive motor is mounted internally within at least one of the struts and moves the adjustable valve assembly so as to adjust the flow path area, which thus varies the flow of oil through the valve assembly and thereby varies the response of the suspension arrangement.

13 Claims, 4 Drawing Sheets

FIG. 3
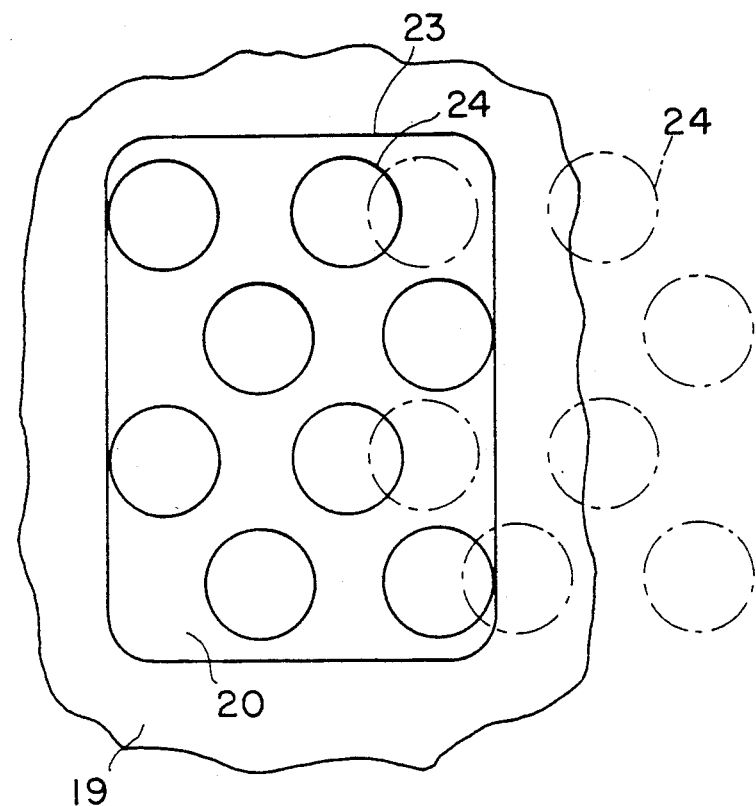
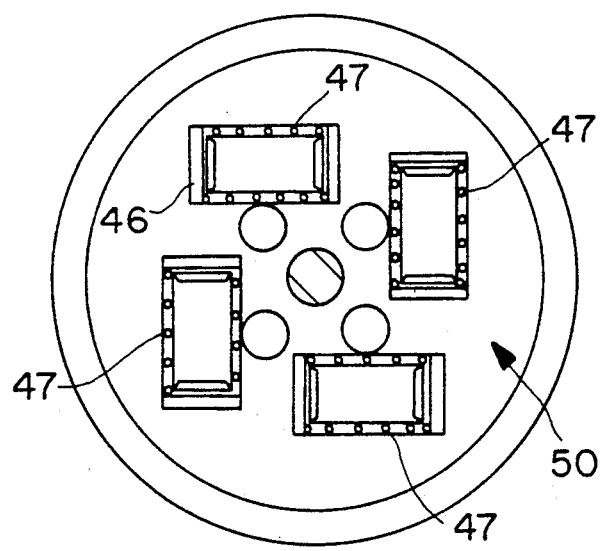
FIG. 4

SUSPENSION ARRANGEMENT

This invention relates to a suspension arrangement and in particular to an aircraft suspension arrangement.

Conventional aircraft landing gear suspensions comprise a simple pneumatic assembly which has to be set to allow safe landings on all types of airfields that will be encountered. The assembly, once set, may not be adjusted in flight in anticipation of the condition of the particular airfield which is to be used.

Therefore as the suspension has to be set so that the aircraft can land or taxi safely on all of the types of airfields it may encounter, for example smooth tarmacadam, mats covering a damaged runway or rough grass track, the suspension has to be set so that it can absorb all the energy which will be imparted to the landing gear by the rougher types of airfield encountered.

However, if the suspension is set too soft, there is a possibility that physical damage to the aircraft may occur as a result of motion induced in the aircraft by landing or taxiing on a rough airfield.

If the aircraft landing gear is set to a condition in which it is highly responsive to airfield conditions i.e. is set soft, so that the landing gear responds to all the bumps etc. in the airfield, when the aircraft taxis on an airfield which will impart a severe rough field performance sinusoidal oscillations could be induced in the landing gear. The effect of these oscillations may be eliminated by providing the landing gear with heavy damping, at a particular point in the sinusoidal oscillating pattern.

Further, if the landing gear is set to a position in which a sinusoidal oscillating pattern is induced, the energy of the motion imparted to the landing gear will not be fully absorbed. This means that components of the aircraft associated with the landing gear are subjected to a number of hard bumps, and therefore to a high degree of sudden stress loading. Consequently, the component parts in this area of the aircraft tend to be overdesigned and therefore heavy, leading to all the problems associated therewith.

With modern aircraft, and in particular the smaller jet aircraft, which carry a large amount of electrical/electronic equipment which is critical to their operation, they are more susceptible to problems induced by any sudden/sharp motion. In particular, the electrical/electronic equipment associated with aircraft is highly tuned, and as a result is sensitive to sudden/sharp movements, such as those discussed above. Therefore subjecting the equipment to sudden/sharp movements, as with the sinusoidal motion or the hard bangs, may lead to the electrical/electronic equipment being detuned, desensitised or becoming generally inoperative. As a consequence modern aircraft have to undergo regularly maintenance leading to a large expense of time and money.

The present invention is concerned with providing a suspension arrangement for use in conjunction with aircraft landing gear, the set/response of which may be adjusted to cope with the particular landing or taxiing conditions.

In accordance with the present invention a suspension arrangement for use with aircraft landing gear comprises:
- an upper strut member;
- a lower strut member;
- an oil reservoir;
- an adjustable valve means mounted so as to divide the oil reservoir into two distinct sections, and which restricts the flow path area for flow of oil from one section of the oil reservoir to the other;
- and a drive means which adjusts the adjustable valve means so as to adjust the flow path area;

wherein adjustment of the flow path area varies the flow of oil through the valve means and thereby the response of the suspension arrangement.

Normally, the position of the adjustable valve means, and hence the response/set of the arrangement is controlled automatically and is dependent on signals received from the landing gear as to the condition of the airfield.

Preferably, the automatic control is achieved by means of a microprocessor which receives signals corresponding to the condition of the airfield, and accordingly alters the position of the adjustable valve means by means of the drive means.

A suspension arrangement in accordance with the present invention has the advantage that the adjustment of the flow path area enables the suspension arrangement to be adjusted in accordance with the type of airfield which will be encountered even during landing on the field.

The adjustable valve means, preferably, comprises two interacting relatively moveable members. In a preferred embodiment the two interacting relatively moveable members comprise two cup like members, one of which is housed within the other so that the members are relatively rotatable.

Alternatively, the relatively moveable members may comprise two members, cup or flat, which are moved axially relative to one another by a drive means arrangement which acts on a push/pull type of principle.

Each of the relatively moveable members is preferably provided with at least one window which co-operates with a window in the other member. The co-operating windows provide the necessary flow path area for flow of oil from one section of the oil reservoir to the other. The flow path area being varied by the relative movement of the two relatively moveable members which adjusts the flow path area for flow of oil.

Due to the characteristics of the system, the Bernoulli forces exerted upon the relatively moveable members, in particular in the vicinity of the windows, may be considerable, and could lead to operational problems/difficulties. In order to reduce these, but maintain the necessary flow path area, the flow path area preferably comprises a series of co-operating windows.

In a preferred embodiment, each one of the windows in the series of windows in one member co-operates with a group of ports in the other member. Thereby the Bernoulli forces are further reduced into several smaller amounts which can be more effective handled.

Preferably, the group of ports have a longitudinal axis which is inclined to the horizontal so as to enhance the flow of fluid therethrough. In experimental tests carried out recently with this type of arrangement the Bernoulli forces exerted on the relatively moveable member have been shown to be reduced to negligible values.

The drive means, preferably, comprises a stepper motor, which is connected to at least one of the relatively moveable members by a coupling.

A minor inconvenience associated with using a stepper motor is that the motor may be slightly bulky with regard to the available space. This would normally only be encountered where space is at a premium.

Where this is the case the stepper motor may be replaced by a simple solenoid arrangement. However this would only provide the adjustable valve means with the option of two settings.

The coupling preferably interconnects the drive means i.e. stepper motor or solenoid, to one only of the relatively moveable members of the adjustable valve means In this case the other member is advantageously held stationary.

Preferably, the coupling used will have a small amount of freedom of motion. This is in order to ensure that the interconnection between the drive means and the relatively moveable member is free, or essentially free, of any stresses. For example, a flexible or fluid coupling may be used.

The stresses, if any, induced in the coupling will, generally, only be of any consequence in respect of embodiments of the suspension arrangement which incorporate relatively moveable members which are relatively rotatable. Although for reasons of assembly etc. it would be advantageous if in both the axially relative movement and rotational relative movement embodiments the coupling had a degree of freedom of movement.

Further, the use of a coupling which provides some freedom of movement in the connection between the adjustable valve means and the drive means will result in no stresses being transmitted from the drive means to the relatively moveable members of the adjustable valve means.

Preferably, the adjustable valve means is provided with means to reduce or eliminate, stresses which may build up therein.

Preferably, the suspension arrangement further includes an hydraulic recoil means. This assists the suspension arrangement in returning to an extended, or normal, operating position.

In a preferred embodiment the drive means is arranged so that it can only act on the relatively moveable members so as to bring about relative motion by movement of a relatively moveable member in one direction only. In this case, mechanical means is provided to cause relative motion in the other direction.

The mechanical means may be arranged so as to act as a fail-safe i.e. where no force is exerted by the drive means the mechanical means forces the relatively moveable members into a preset/fail-safe position. Therefore, in order to obtain any other position the drive means must act against the force exerted by the mechanical means. Preferably the mechanical means comprises a spring arrangement.

Preferably, the suspension arrangement also includes a piston member, which is mounted within the upper strut member.

The provision of the piston member, means that the suspension arrangement can be simply provided with a two stage response arrangement. That is, by having the piston member act against a general atmosphere which has a pressure greater than the atmosphere generally available in the system, the stage of suspension comparison at which the arrangement reacts can be predetermined.

The invention will now be described, by way of example, with reference to the accompanying drawings in which:

FIG. 3 shows a schematic diagram of the flow path area of the suspension arrangement shown in FIG. 2;

FIG. 4 shows a schematic diagram of the mechanical means of the suspension arrangement shown in FIG. 2.

Figure 1:
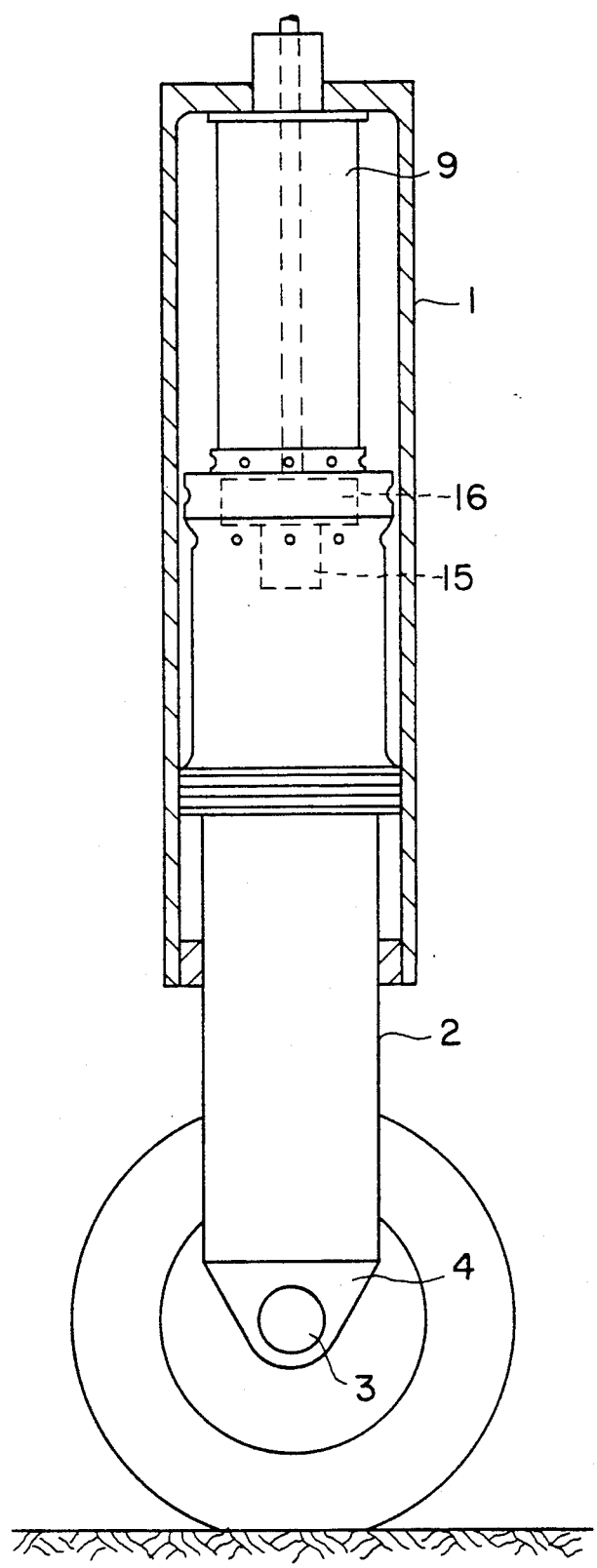
FIG. 1 shows a schematic view of a suspension arrangement included in a landing gear.

Now referring to FIGS. 1 to 4 of the drawings, in accordance with a first embodiment of the invention a suspension arrangement comprises:

an upper strut member 1;

a lower strut member 2 which telescopically co-operates with the upper strut member 1 and which is provided with a mounting means 3 at an end 4 thereof on which a wheel can be mounted;

an oil reservoir 5 defined by the interior surfaces of the outer strut members 1, 2;

a tube member 6 mounted so that it circumferentially surrounds a section 7 of the lower strut member 2 and is housed within a section 8 of the upper strut member 1;

an upper tube member 9 positioned so that an end 10 thereof is housed within the lower strut member 2;

a sleeve member 11 mounted within the lower strut member 2 at an end 12 thereof and which circumferentially surrounds the upper tube member 9;

an annular piston 13 housed within the upper tube member 9;

a cap member 14;

an adjustable valve means 15; and a stepper motor 16 housed within the upper tube member 9.

Within the confines of the upper strut member 1 the lower strut member 2, the tube member 6 and the sleeve member 11 are interconnected so as to form a single common assembly.

Further, in order to prevent oil escape from the reservoir two sealing members 17, 18 are provided so as to form a sealing contact between the upper strut member 1 and the tube member 6.

In view of the above mentioned interconnection this means that a sealing contact is provided between the upper and lower strut members 1, 2.

The adjustable valve means 15 includes an outer cup member 19 and an inner cupmember 20 mounted within the outer cup member 19 so that the inner cup member has a section 21, extending therebelow.

The outer cup member 19 is connected by means of a flexible coupling 22 to the stepper motor 16 and, in this embodiment is rotatably moveable by the action of the stepper motor, whilst the inner cup member 20 is maintained stationary so as to provide the required relative motion.

The adjustable valve means 15 is positioned in the oil reservoir 5 so as to divide the reservoir into two distinct sections 5a and 5b. The oil contained in the oil reservoir section 5b has a pressurised nitrogen atmosphere thereabove.

During operation of the suspension arrangement oil within the reservoir is transferred between the distinct sections, in order to provide the necessary suspension forces. This may cause some frothing/aeration of the oil in the section 5b of the reservoir 5.

To allow for the passage of oil from one section of the oil reservoir to the other the outer cup member 19 is provided with a circumferentially extending series of windows 23 and the inner cup member 20 is provided with a circumferentially extending series of ports 24.

The series of windows 23 and the series of groups of ports 24 are positioned in the respective cup members 19, 20 so that each window 23 co-operates with a number of ports 24. The degree of the co-operation between the windows and the ports provides the flow path area for the flow of oil between the two distinct sections of the oil reservoir. Therefore, rotation of the outer cup member 19 by the action of the stepper motor 16 varies the flow path area available for the flow of oil. This in turn dictates the level of response obtained from the system on the application of a force.

FIG. 3 shows in detail the relative positions for the windows 23 with respect to a group of windows 24. The group of windows 24 are indicated in solid line for the maximum flow situation and dashed lines for a restricted flow situation.

In order to reduce, or eliminate, stresses which may occur in the adjustable valve means 15 as a result of the function of the system a series of holes 25 is provided in the outer cup member, 19 in the vicinity of the flexible coupling 22. This series of holes 25 does not allow the passage of oil from one section of the oil reservoir to the other.

In order to allow for the relative rotation of the two cup members 19, 20 mechanical bearings (not shown) may be provided between certain engaging surfaces of the cup members. In this way the frictional forces induced in the adjustable valve means 15 may be reduced to a minimum.

The cap member 14 is positioned so that an end 26 circumferentially surrounds and engages a section of the stepper motor 16. The other end 27 is inturned, and engages in a groove 28 provided in the section 21 of the inner cup member 19.

The cap member 14 and inner cup member 20 are held relatively stationary by means of pins 29 securing the cap member 14 to the inner cup member 20. The cap member 14 is provided with a recoil valve 30, to assist the system when returning to a normal operating position.

The upper tube member 9 has an end 31 in which the stepper motor 16 is housed and in which an end 32 of the cap member 14 extends.

The cap member 14 is provided with an abutment 33 which engages in a groove 33b provided in the member 9 so as to restrict the degree of insertion of the cap member 14 therein.

The end 31 of the upper tube member 9 is sealingly engaged with the internal surface of the lower strut member 2 by means of a sealing member 34 provided therein, and the other end 35 of the upper tube member 9 is sealingly engaged to the upper strut member by sealing means 35. The stepper motor 16 has a control cable 36 which is passed along a cable support 37 to the stepper motor. The cable support 37 is passed through the hollow interior of the upper tube member 9 to the stepper motor.

In order to ensure integrity of the system a seal 38 is provided between the upper tube member 9 and the cable support 37.

The annular piston 13 is housed within the upper tube member 9 and has a passageway therethrough to allow the cable support 37 to pass during travel of the piston 13. Further, to ensure integrity of the system two sealing rings 39 are provided on the annular piston.

The two sealing rings 39 are used to isolate the oil reservoir 5b from the general atmosphere section 5d above the annular piston 13. The pressure in the section 5d when the suspension arrangement has been assembled is greater than that present in the remainder of the suspension arrangement.

In this way the point at which the annular piston 13 will move, i.e. respond to the compression of the suspension arrangement may be preset.

Figure 2:
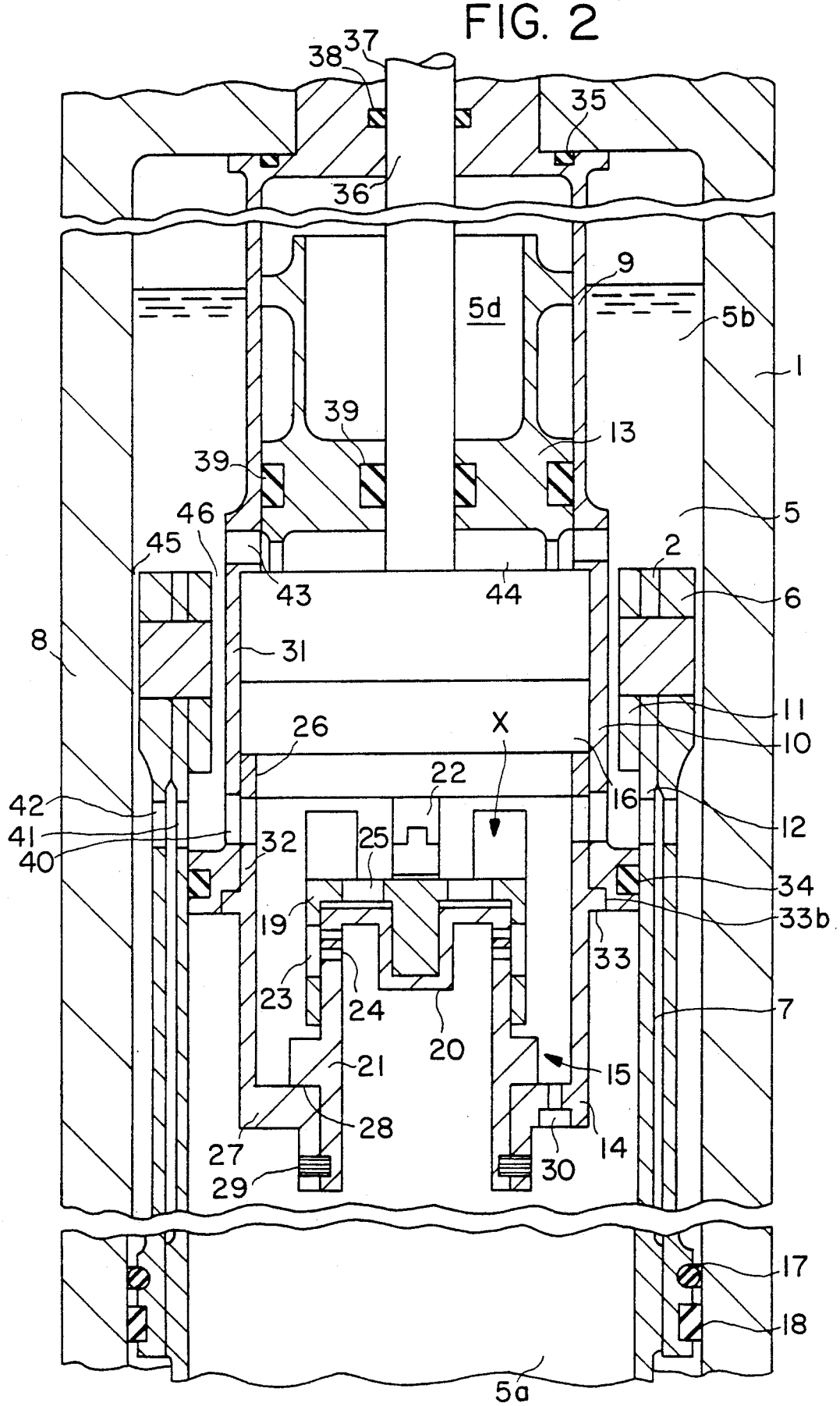
FIG. 2 shows a schematic diagram of a suspension arrangement in accordance with a first embodiment of the invention included in the landing gear as shown in FIG. 1.

Once assembled, the system oil reservoir 5 is filled with oil to a level indicated in FIG. 2.

To enable flow of oil within the system during operation of the suspension arrangement the following passages are provided in the assembly:

passage 40 through upper tube member 9 and cap member 14;
passage 41 through lower strut member 1;
passage 42 through tube member 6; and
passage 43 through upper tube member 9 to allow oil into space 44 below the annular piston 13.

In all cases the passages 40-41 simply comprise a circumferentially extending series of slots. In the case of passage 40, and passages 41 and 42 in combination, the respective series of slots are aligned so that they co-operate.

In operation, the relative motion of the inner cup member 20 and the outer cup member 19, and therefore windows 23 with respect to groups of windows 24, which adjusts the suspension arrangement's response, is caused by the inter action of forces induced by the stepper motor 16, and a mechanical means 50 (not shown in FIGS. 1 and 2). The mechanical means is located at the general position X shown in FIG. 2.

The mechanical means 50, as shown in detail in FIG. 4, comprises four springs 47 mounted on the outer cup member, 20 so as to act against stops 45 thereon and stops 46 provided on the stepper motor 16.

The mechanical means 50 is arranged so that in the case of stepper motor failure the windows 23, and ports 24 of the adjustable valve means 15 are forced into the relative position shown in hard lines in FIG. 3, i.e. the suspension arrangement is automatically set to a soft open configuration.

In operation, under compression, oil flows from oil reservoir section 5a of the oil reservoir to section 5b. The oil passes through windows 23, and ports 24, through passage 40, and through passages 41, 42. This causes oil to flow along passageways 45, 46, provided between upper tube member 9 and the sleeve 11, and outer strut member 1 and tube member 6 respectively. These passageways are provided by making the respective components of the system at the appropriate position a clearance fit.

The actual operation of the system, and therefore the force exerted by the stepper motor 16 and thereby the relative position of the cup members 19, 20 of adjustable valve is controlled by a microprocessor (not shown). The microprocessor receives signals, relating to the condition of the airfield, which it analyses and the microprocessor accordingly instructs the stepper motor 16 as to the desired set/response of the suspension arrangement. That, the stepper motor 16 is instructed as to the position of cup members 19, 20 desired.

Figure 5:
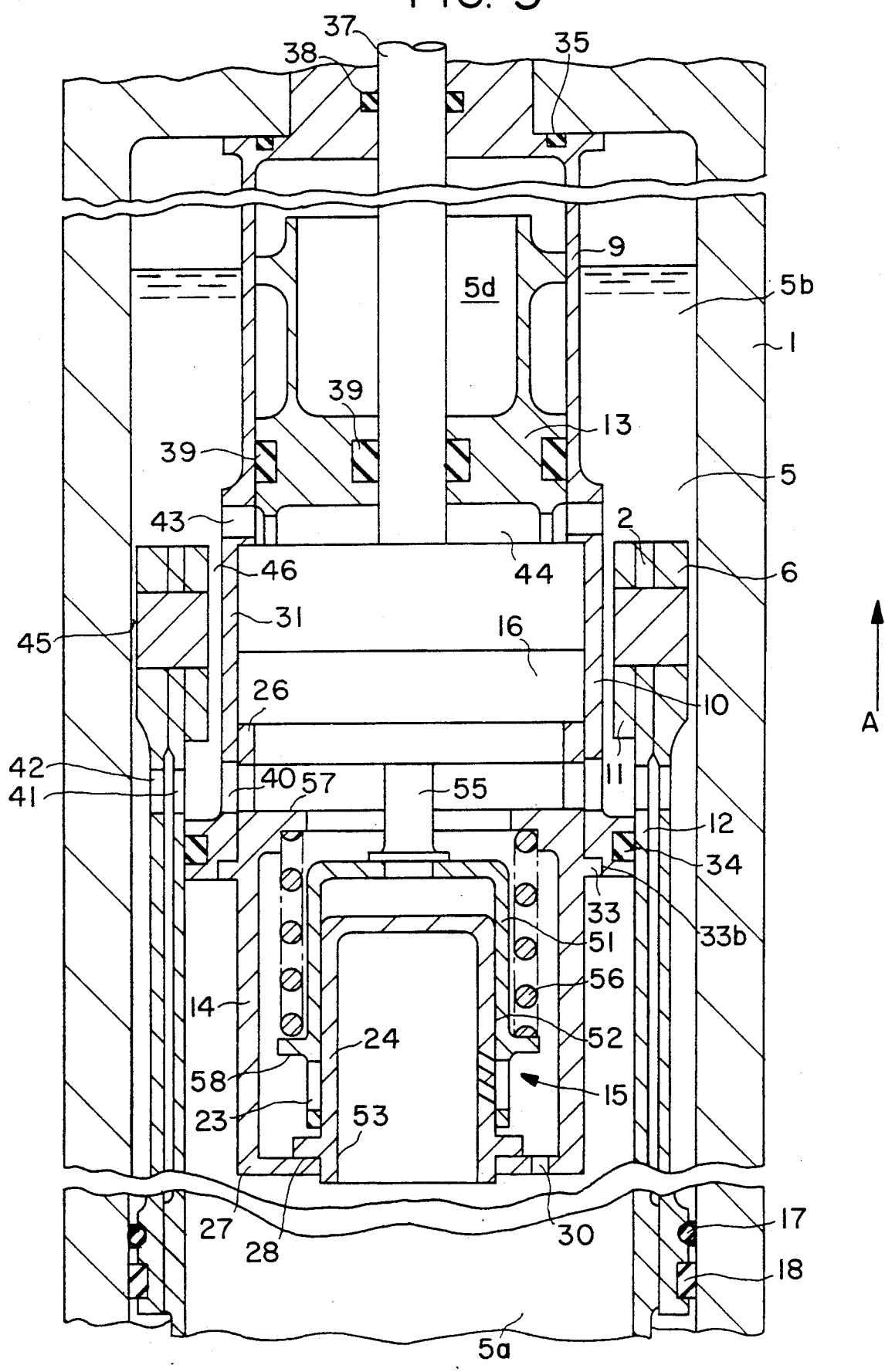
FIG. 5 shows a schematic diagram of a suspension arrangement in accordance with a second embodiment of the invention included in the landing gear as shown in FIG. 1.

Now referring to FIG. 5 of the drawings, a second embodiment of the suspension arrangement in accordance with the present invention is shown.

The second embodiment of the invention is similar in construction to that of the first embodiment of the invention described above, and therefore where appropriate like numerals have been used to denote like components. Further, the specific description of these components is incorporated in the description of this embodiment by way of reference.

The differences between the first embodiment and the second embodiment of the invention are a result of the differences incorporated in order to allow for the difference in the direction of movement of the two relatively moveable members i.e. axial not rotary.

The adjustable valve means 15 comprises an outer cup member 51 and an inner cup member 52, which is mounted within the outer cup member so that a section 53 protrudes therebelow.

The cap member 14, is identical to that used in the first embodiment, having an end 26 which circumferentially surrounds and engages a section of an actuator 16a, and an end 27 which is interned, and engages in a groove 28 provided in the section 53 of the inner cup member 52. The cap member 14 and inner cup member 52 are interconnected so that they are relatively stationary.

The outer cup member 51 is connected to the actuator 16a by means of a coupling 55. In this embodiment of the invention the coupling may be provided to allow a certain amount of freedom of movement.

The actuator 16a is adapted so that the outer cup member 51 is moved in a direction A relative to the stationary inner cup member 52.

Further, a mechanical means is provided in the form of a coil spring 56 which acts between protrusion 57 on the cap member 14 and protrusion 58 on the outer cup member 52 so that the relative motion of the two relative members is the result of a force balance between the actuator 16a and coil spring 56.

As in the first embodiment of the invention of the arrangement of the mechanical means is such that upon a failure of the actuator 16a the force exerted by the coil spring 56 forces the adjustable valve means 15 to be set to a open/soft position suitable for landing. As in the first embodiment the outer cup member 51 is provided with a series of windows 23 and the inner cup member 52 is provided with a series of group of ports 24.

The general principle of flow path area, and its variation to effect the response the system is identical to that discussed with regard to the first embodiment. However, in this embodiment the ports 24 are angled slightly in order to enhance the flow of oil therethrough, and reduce any Bernoulli forces which may be exerted upon the cap members as a result of the flow of oil therethrough to a negligible value.

The operation, and flow of oil during operation, is identical to that described with reference to the first embodiment of the invention, except the relative motion of the two relatively moveable members is axial, not rotary.

I claim:

1. In a suspension arrangement for use with aircraft landing gear, comprising:
   an upper strut;
   a lower strut that is assembled with and telescopes relative to the upper strut;
   an oil reservoir within the struts;
   an adjustable valve means which comprises two interacting relatively movable members which divide the oil reservoir into two distinct sections and provide a restricted flow path for the flow of oil from one section of the oil reservoir to the other;
   the improvement wherein each of the relatively movable members includes aperture means for the flow of oil from one section of the oil reservoir to the other thereby to provide said flow path, said aperture means comprising a series of windows in one said member, registrable with ports in the other said member which are smaller than said windows, each said window being registrable simultaneously with a plurality of said ports, said ports being so positioned relative to said windows that movement of said members relative to each other progressively changes the number of said ports that are simultaneously in register with each said window; and
   a drive means which is mounted internally within at least one of the struts and which moves the adjustable valve means so as to adjust the flow path area; whereby adjustment of the flow path area varies the flow of oil through the valve means and thereby the response of the suspension arrangement.

2. A suspension arrangement as claimed in claim 1, in which automatic control thereof is achieved by means of a microprocessor which receives signals corresponding to the condition of the airfield, and accordingly alters the position of the adjustable valve means by means of the drive means.

3. A suspension arrangement as claimed in claim 1 in which the two interacting relatively moveable members comprise two cup like members, one of which is housed within the other so that the members are relatively rotatable.

4. A suspension arrangement as claimed in claim 1, in which the relatively moveable members comprise two members which are moved axially relative to one another by a drive means arrangement which acts on a push/pull type of principle.

5. A suspension arrangement as claimed in claim 1, in which the group of ports have a longitudinal axis which is inclined to the horizontal so as to enhance the flow of fluid therethrough.

6. A suspension arrangement as claimed in claim 1, in which the drive means comprises a stepper motor, which is connected to at least one of the relatively moveable members by a coupling.

7. A suspension arrangement as claimed in claim 6, in which the coupling interconnects the drive means with one only of the relatively moveable members of the adjustable valve means.

8. A suspension arrangement as claimed in claim 7, in which the coupling used has a small amount of freedom of movement.

9. A suspension arrangement as claimed in claim 1, in which the adjustable valve means is provided with means to reduce stresses therein.

10. A suspension arrangement as claimed in claim 1, which further includes a recoil means.

11. A suspension arrangement as claimed in claim 1, in which the drive means is arranged so that it can only act on the relatively moveable members so as to bring about relative motion by movement of a relatively moveable member in one direction only.

12. A suspension arrangement as claimed in claim 1, in which a mechanical means is provided, to cause relative motion between the relatively moveable members in the opposite direction to that imparted by the drive means, with a spring arrangement.

13. A suspension arrangement as claimed in claim 1, in which a piston member is mounted within the upper strut member.

* * * * *